(12) United States Patent
Gollnick et al.

(10) Patent No.: US 11,795,918 B2
(45) Date of Patent: Oct. 24, 2023

(54) MANAGING WARNING LIGHTS IN A WIND TURBINE

(71) Applicant: Siemens Gamesa Renewable Energy A/S, Brande (DK)

(72) Inventors: Bert Gollnick, Hamburg (DE); Simon Slapka, Hamburg (DE)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/629,882

(22) PCT Filed: Jul. 28, 2020

(86) PCT No.: PCT/EP2020/071236
§ 371 (c)(1),
(2) Date: Jan. 25, 2022

(87) PCT Pub. No.: WO2021/023575
PCT Pub. Date: Feb. 11, 2021

(65) Prior Publication Data
US 2022/0252052 A1 Aug. 11, 2022

(30) Foreign Application Priority Data
Aug. 6, 2019 (EP) ..................................... 19190155

(51) Int. Cl.
*F03D 80/10* (2016.01)
*G08B 5/36* (2006.01)
(52) U.S. Cl.
CPC ............... *F03D 80/10* (2016.05); *G08B 5/36* (2013.01); *F05B 2270/8041* (2013.01)
(58) Field of Classification Search
CPC .... F03D 80/10; G08B 5/36; F05B 2270/8041
See application file for complete search history.

(56) References Cited

U.S. PATENT DOCUMENTS

| | | | |
|---|---|---|---|
| 8,482,435 B2* | 7/2013 | Wobben | F03D 80/10 340/963 |
| 2012/0026320 A1* | 2/2012 | Bryceland | G08G 5/0026 348/135 |

(Continued)

FOREIGN PATENT DOCUMENTS

| | | |
|---|---|---|
| CA | 3 026 820 A1 | 12/2017 |
| DE | 10 2016 013944 A1 | 5/2018 |

OTHER PUBLICATIONS

International Search Report & Written Opinion for PCT/EP2020/071236 dated Nov. 10, 2020.

*Primary Examiner* — John A Tweel, Jr.
(74) *Attorney, Agent, or Firm* — Schmeiser, Olsen & Watts LLP

(57) ABSTRACT

Provided is a warning light apparatus for at least one wind turbine including: at least one warning light, at least one sensor for detecting the presence of an object, a presence acquisition device connected to the at least one sensor the presence acquisition device being configured for: triggering the capturing of data through the at least one sensor, analysing the data captured through the at least one sensor for detecting the presence of objects, a warning controller connected to the at least one warning light and the presence acquisition device, the warning controller being configured for: receiving information about the detection of objects from the presence acquisition device, sending function signals depending on the information received from the presence acquisition device for activating or deactivating the at least one warning light.

10 Claims, 3 Drawing Sheets

(56) References Cited

U.S. PATENT DOCUMENTS

2014/0300497 A1    10/2014   Harms et al.
2016/0050889 A1     2/2016   Wenger et al.
2019/0257293 A1*   8/2019   Harms ................... G06V 20/13

* cited by examiner

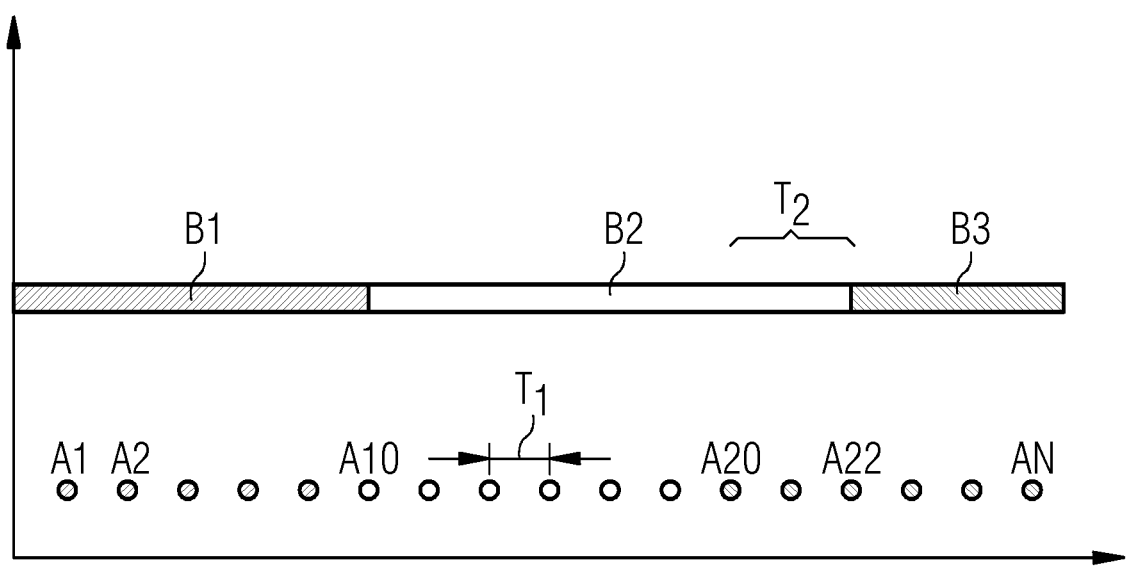

MANAGING WARNING LIGHTS IN A WIND TURBINE

CROSS-REFERENCE TO RELATED APPLICATIONS

This application claims priority to PCT Application No. PCT/EP2020/071236, having a filing date of Jul. 28, 2020, which claims priority to EP Application No. 19190155.2, having a filing date of Aug. 6, 2019, the entire contents both of which are hereby incorporated by reference.

FIELD OF TECHNOLOGY

The following relates to a warning lights apparatus for a wind turbine or a wind farm comprising a plurality of wind turbines. The following further relates to a method for managing warning lights for a wind turbine or a wind farm comprising a plurality of wind turbines.

BACKGROUND

Typically, all turbines in a wind farm operate at night with warning lights (also known as "navigation lights" or "anti-collision lights") to signal the presence of the wind turbines to planes flying in the vicinity. The activation and deactivation of the lights is purely time-based, i.e., the lights are activated at night and deactivated during daytime. This causes the so-called "disco light effect", which may be annoying to residents. Most of the time this annoyance is not necessary, because there are no planes around that would require the "warning" of a nearby wind farm. Furthermore, there may be soon local regulations requiring the disco light effect to be avoided. Such regulations may eventually require the wind turbines to stop to prevent the consequent annoyance to the resident population.

SUMMARY

An aspect relates to a warning lights apparatus and a method for managing warning lights, in order to overcome the problems, which were cited above with reference to the conventional art.

According to a first aspect of embodiments of the present invention, a warning light apparatus for at least one wind turbine is provided. The warning light apparatus comprises:
  at least one warning light,
  at least one sensor for detecting the presence of an object,
  a presence acquisition device connected to the at least one sensor, the presence acquisition device being configured for:
    triggering the capturing of data through the at least one sensor,
    analysing the data captured through the at least one sensor for detecting the presence of objects.
  a warning controller connected to the at least one warning light and the presence acquisition device, the warning controller being configured for:
    receiving information about the detection of objects from the presence acquisition device,
    sending function signals depending on the information received from the presence acquisition device for activating or deactivating at least one warning light.

According to a second aspect of embodiments of the present invention, a method for managing warning lights is provided, for at least a wind turbine including at least one warning light. The method comprises the steps of:
  capturing data through at least one sensor associated to the at least one wind turbine,
  analysing the data captured through the at least one sensor for detecting objects,
  sending function signals depending on the information received from the presence acquisition device for activating or deactivating at least one warning light.

The warning light apparatus and method of embodiments of the present invention may serve one single wind turbine or a plurality of wind turbines. The plurality of wind turbines may constitute a wind farm. With the term "warning light" it is intended any light, which signals the presence of one or more wind turbines to an object in the proximity of the wind turbine(s), in particular an approaching object. Such object may be for example an airplane. Airplanes are required to emit light at light, so that they are visible and detectable also at night. According to embodiments of the present invention, the warning lights can be activated only when necessary, i.e., when an object is present in the proximity of the wind turbine(s). This permits to reduce to a minimum the annoyance associated with the disco light effect.

According to embodiments of the present invention, the "one sensor for detecting the presence of an object" may be a camera. According to embodiments of the present invention, the camera is an infrared camera, so that the warning light apparatus may be operated at night. According to other embodiments of the present invention, the "one sensor for detecting the presence of an object" may be a sensor detecting sound emissions. For example, directional microphones that monitor specific sky areas may be used. According to embodiments of the present invention, different sensors, for example cameras and microphones, may be used together.

According to embodiments of the present invention, the at least one sensor is installed on a wind turbine, for example on the nacelle or on the tower. Alternatively, the sensors(s) may be installed at the ground, distance from the wind turbine(s), which are served from the warning light apparatus. According to embodiments of the present invention, a plurality of cameras are used to monitor an area extending for an angle of 360° around the wind turbine(s). According to an embodiment of the present invention, four cameras may be used pointing towards respective direction at regular angular distance of 90°, each camera covering an angular sector of 90°. For large wind farms, only the wind turbines at the edge of the wind farm may be provided with cameras, because they have the clearest view (no turbines between them and an approaching object). For redundancy and higher system reliability, more cameras than the one strictly necessary for the apparatus to correctly work may be installed.

According to an embodiment of the present invention, each wind turbine comprises a respective sensor for detecting the presence of an object. When the sensors are installed on the nacelles of a plurality of wind turbines, since all wind turbines during normal operation yaw together into wind direction, their coverage of 360° around the plurality of wind turbines persists, even if turbines yaw. When the sensors are installed on fixed points, for example on the towers of the wind turbines or on the ground, the orientations of the cameras are independent from yawing or wind direction.

In the context of embodiments of the present invention, a "presence acquisition device" can be implemented as a hardware device and/or a programmable logic device configured and arranged for implementing the specified operations/activities. In possible embodiments, a programmable device may include one or more computer circuits programmed to execute a set (or sets) of instructions (and/or configuration data). The instructions (and/or configuration data) can be in the form of firmware or software stored in and accessible from a memory. The presence acquisition device may include instruction based on Deep Learning, specifically Convolutional Neural Networks. According to embodiments of the present invention, the presence acquisition device triggers the capturing of data through the at least one sensor at a predefined periodic time interval, for example every 5 seconds.

Advantageously, when the warning controller takes inputs from a plurality of wind turbines in a wind farm, the warning controller may be implemented as one central for the complete wind farm, for example included in the wind farm general controller. The presence acquisition device may be also integrated in the wind farm general controller.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless otherwise notified, in addition to any combination of features belonging to one type of subject-matter also any combination between features relating to different subject-matters, in particular between features of the apparatus type claims and features of the method type claims is considered as to be disclosed with this application.

BRIEF DESCRIPTION

Some of the embodiments will be described in detail, with reference to the following figures, wherein like designations denote like members, wherein:

FIG. 3 shows a diagram illustrating as a function of time the operational functioning of the warning light apparatus according to embodiments of the present invention.

DETAILED DESCRIPTION

Figure 1:
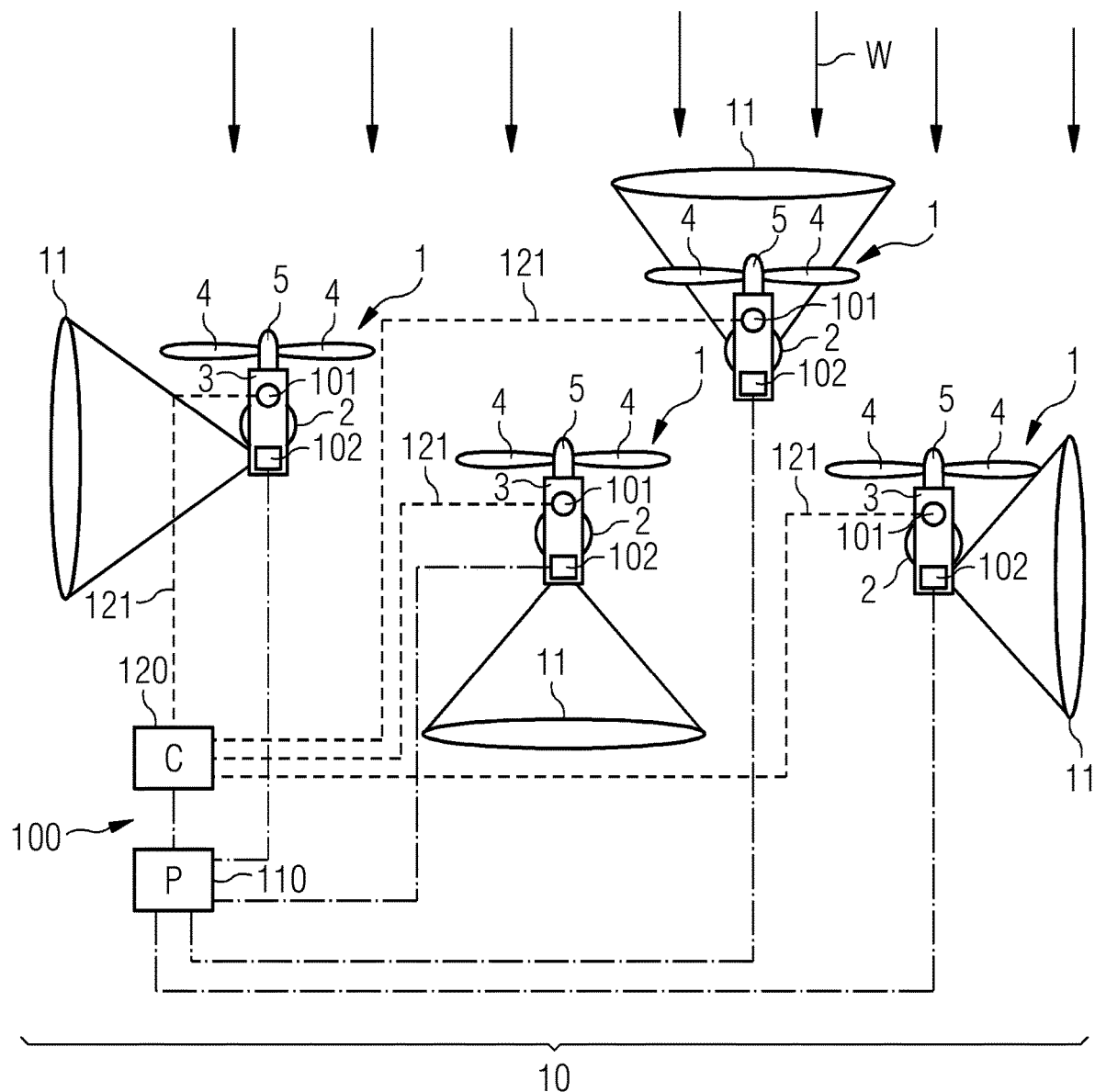
FIG. 1 shows a schematic view of a first embodiment of a wind farm including a plurality of wind turbines and a warning light apparatus according to embodiments of the present invention.
Figure 2:
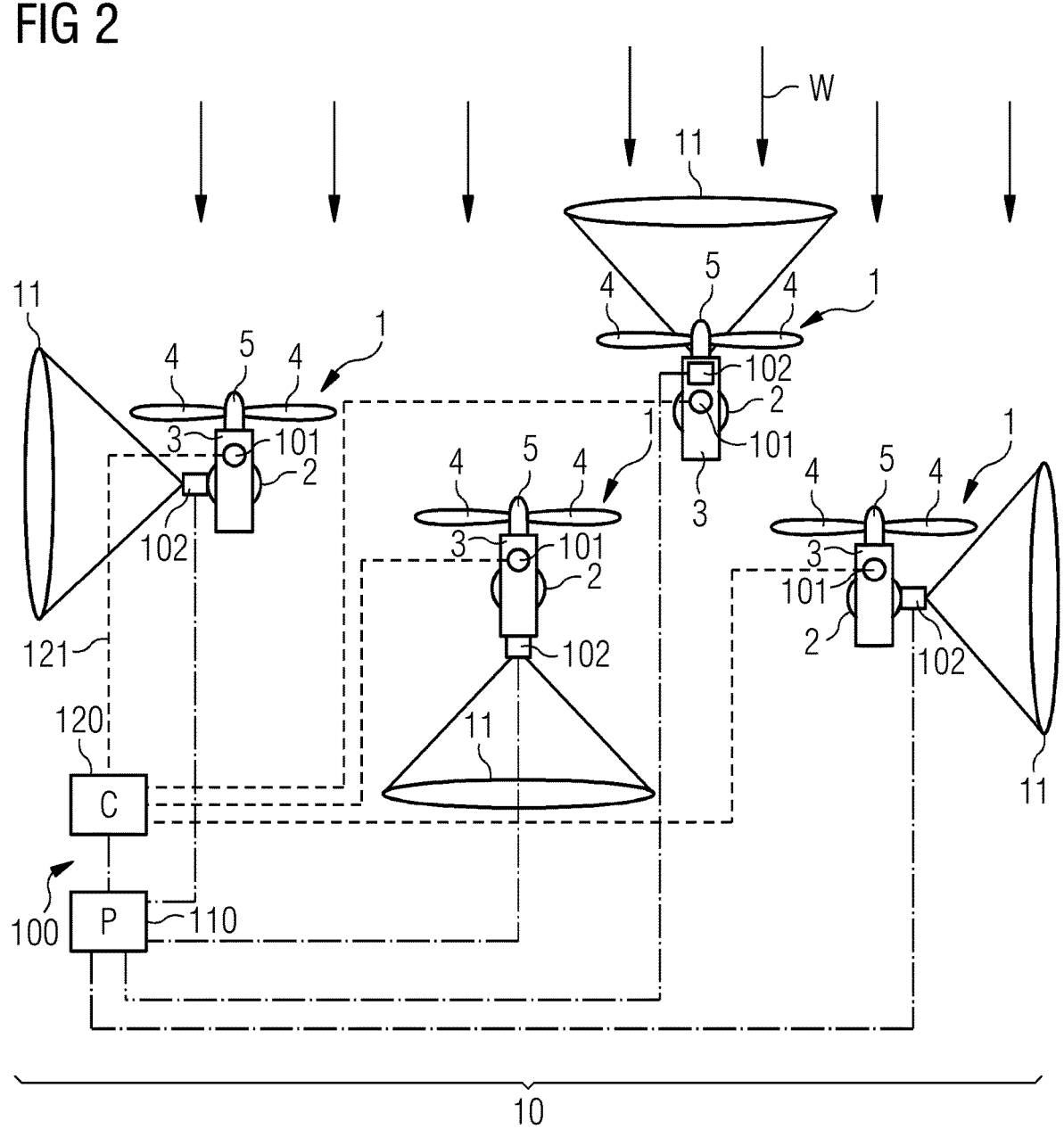
FIG. 2 shows a schematic view of a second embodiment of a wind farm including a plurality of wind turbines and a warning light apparatus according to embodiments of the present invention.

FIGS. 1 and 2 show a wind farm 10 comprising four wind turbines 1. According to other embodiments of the invention (not shown), the present invention may be applied to wind farms including any number of wind turbines. According to other embodiments of the invention (not shown), the present invention may be applied to a single turbine. Each wind turbine 1 comprises a tower 2, a nacelle 3 attached to the tower 2 and a wind turbine rotor 5 having a plurality of blades 4 (in the perspective of FIGS. 1 and 2 only two blades 4 are visible). The rotor 5 is attached to the nacelle 3 in order to be rotatable around a rotational axis. In the embodiments of the attached FIG. 1, the rotational axis of the wind turbines is aligned with a prevalent direction W of the wind. The transformation of the wind energy into electrical energy performed by the wind turbines 1 is not a specific object of embodiments of the present invention and therefore not described in further details.

The wind farm 10 comprises a warning light apparatus 100. The warning light apparatus 100 includes at least one warning light 101. Four warning lights 101 are provided in the embodiment of the attached FIGS. 1 and 2, each wind turbine 1 comprising a warning light 101 attached to the respective nacelle 3. According to other embodiments of the invention (not shown), the warning lights 101 may be attached to other component of the wind turbine 1, for example to the tower 2. According to other embodiments of the invention (not shown), a plurality of warning lights 101 may be attached to each wind turbine 1. According to other embodiment of the invention (not shown), a portion of the plurality of wind turbines of the wind farm 1 are not provided with warning lights 101. The warning lights 101 are activated and deactivated according to embodiments of the present invention, as detailed in the following.

The warning light apparatus 100 includes at least one camera 102. Each camera 102 may be an infrared camera. Four cameras 102 are provided in the embodiment of the attached FIGS. 1 and 2, each wind turbine 1 comprising a camera 102. In the embodiment of FIG. 1, each camera 102 is attached to the respective nacelle 3. In the embodiment of FIG. 2, each camera 102 is attached to the respective tower 2. According to other embodiments of the invention (not shown), each camera 102 may be fixed to the ground, at a convenient distance from the wind turbines 1. According to other embodiments of the invention (not shown), a plurality of cameras 102 may be attached to each wind turbine 1. According to other embodiments of the invention (not shown), only a portion of the plurality of wind turbines of the wind farm 1 are provided with cameras 102. Each camera 102 monitors a respective sky area 11. According to the embodiment of the attached FIGS. 1 and 2, the four cameras 102 point towards respective direction at regular angular distance of 90°, each camera covering an angular sector of 90°. The four cameras monitor therefore an area extending for an angle of 360° around the wind turbines.

According to other embodiments (not shown) of the present invention, instead of the cameras 102, a plurality of directional microphones that monitor specific sky areas may be used. According to other embodiments (not shown) of the present invention, one or more cameras and one or more microphones may be used together.

The warning light apparatus 100 includes a presence acquisition device 110 (schematically represented by the block P in FIGS. 1 and 2) connected to the cameras 102. The presence acquisition device 110 is hardware device and/or a programmable logic device and is configured for triggering the capturing of images through the cameras 102. The presence acquisition device triggers the capturing of images through the cameras 102 at a predefined fixed periodic time interval T1, for example every 5 seconds. The presence acquisition device 110 is further configured for analysing the images captured through the cameras 102 for detecting objects, in particular for detecting an approaching vehicle, such as an aeroplane. The information outputted by the image analysis may be of the Boolean type, including only two possible outputs, i.e., "object detected" or "no object detected". The information outputted by the image analysis may include further data, for example current location, and approach direction of the detected object.

The warning light apparatus 100 includes a warning controller 120 (schematically represented by the block C in FIGS. 1 and 2) connected to the warning lights 101 and the presence acquisition device 110. The warning controller 120 is configured for receiving information about the detection of objects from the presence acquisition device 110 and for sending function signals 121 for activating or deactivating the warning lights 101. The function signals 121 are dependent on the information received from the presence acquisition device 110. The warning controller 120 may be a component of a general controller of the wind farm 10. The presence acquisition device 110 may be also a component of a general controller of the wind farm 10.

Once an object, for example a plane is spotted, the presence acquisition device 110 provides the information "object detected" to the warning controller 120. The warning controller 120 sends function signals 121 for activating the warning lights 101. Once the object has disappeared, the presence acquisition device 110 provides the information "object not detected" to the warning controller 120. As better explained with reference to the exemplary embodiment of FIG. 3, after a grace period T2, the warning controller 120 sends function signals 121 for deactivating the warning lights 101.

According to other embodiments of the present invention, the warning controller 120 may activate only a portion of the warning lights 101. For example, only the portion of the warning lights 101 may be activated, which are closer to the detected object. This may be particularly efficient for wind farm of relevant dimensions.

In FIG. 3, the plurality of dots A1 . . . AN represent the results of the analysis performed presence acquisition device 110, each dot representing an analysis result (for example, "object detected" or "object not detected") performed by the presence acquisition device 110 each time the capturing of data through the cameras 102 is triggered. Each pair of two consecutive dot are spaced by a constant time interval T1, for example 5 seconds. At the beginning of the analysis, the presence acquisition device 110 detects no object and generate generates the information "object not detected", represented by the dot A1. The turbines 1 operate with navigation lights deactivated, as represented by a first bar B1 in the diagram of FIG. 3. At a certain point in time (for example after nine-time intervals T1, as shown in FIG. 3 by the dot A10) an image, which shows a plane, is processed by the presence acquisition device 110. The warning controller 120 receives the information "object detected" and activate the warning lights 101 by sending a correspondent function signal 121. The activation of the warning lights 101 is represented in the diagram of FIG. 3 by a second bar B2 adjacent to the first bar B1 at the same point in time of the dot A10. At another point in time (for example, as shown in FIG. 3 by the dot A20 generated ten-time intervals T1 after the dot A10) no plane is spotted anymore and the warning controller 120 receives the information "object not detected" from the presence acquisition device 110. The warning lights 101 are not immediately deactivated by the warning controller 120, but for safety reasons the warning controller 120 waits for a grace period T2, after the information "object not detected" has been received. The grace period T2 may correspond to a multiple of the constant time interval T1 (for example, two-time intervals T1, as shown in FIG. 3). The warning controller 120 deactivates the warning lights 101 by sending a correspondent function signal 121 at the end of the grace period T2. The deactivation of the warning lights 101 is represented in the diagram of FIG. 3 by a third bar B3 adjacent to the second bar B2 at a point in time represented by the dot A22, distanced of two-time intervals T1 from the dot A20.

According to embodiments of the invention, the warning light apparatus 100 may include a plurality of cameras 102 pointing in the same direction, for redundancy purposes. If several images are taken by different cameras pointing in the same direction, a plurality of control strategies might be applied. In a first control strategy, the warning lights are activated when one image shows an object, even if the other images do not show any object. This is the most conservative approach, but also leads to the most annoyance of residents. In a second control strategy, the warning lights are activated only if all images show an object. This is the most aggressive strategy having the highest probability of missing an actual plane, but which leads to the lowest annoyance of residents. Other strategies for balancing between safety and annoyance may lie between the two extreme strategies above described.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A warning light apparatus for at least one wind turbine comprising:
   at least one warning light;
   at least one sensor for detecting a presence of an object;
   a presence acquisition device connected to the at least one sensor, the presence acquisition device being configured for:
      triggering a capturing of data through the at least one sensor at a predefined periodic time interval; and
      analyzing the data captured through the at least one sensor for detecting the presence of objects;
   a warning controller connected to the at least one warning light and the presence acquisition device, the warning controller being configured for:
      receiving information about a detection of objects from the presence acquisition device; and
      sending function signals depending on information received from the presence acquisition device for activating or deactivating the at least one warning light, wherein the warning controller waits to send a function signal to deactivate the at least one warning light until an end of a grace period corresponding to a multiple of the periodic time interval.

2. The warning light apparatus according to claim 1, wherein the at least one sensor is installed on the at least one wind turbine.

3. The warning light apparatus according to claim 1, wherein the at least one sensor is installed on the ground, distanced from the at least one wind turbine.

4. The warning light apparatus according to claim 1, wherein the at least one sensor is a camera.

5. The warning light apparatus according to claim 4, further comprising a plurality of cameras for monitoring an area angularly extending for 360° around the at least one wind turbine.

6. The warning light apparatus of claim 4, wherein the camera is an infrared camera.

7. The warning light apparatus according to claim 1, wherein the objects to be detected by the presence acquisition device are planes.

8. A wind turbine comprising the warning light apparatus according to claim 1.

9. A wind farm comprising a plurality of wind turbines and the warning light apparatus according to claim 1.

10. A method for managing warning lights for at least a wind turbine including at least one warning light, the method comprising:

capturing data through at least one sensor associated to the at least one wind turbine at a periodic time interval;

analyzing the data captured through the at least one sensor for detecting objects; and sending function signals depending on information received from the presence acquisition device for activating or deactivating the at least one warning light, wherein a function signal to deactivate the at least one warning light is sent at an end of a grace period corresponding to a multiple of the periodic time interval.

\* \* \* \* \*